L. W. CROMPTON AND W. J. GRAHAM.
AUTO EMERGENCY TIRE.
APPLICATION FILED JAN. 6, 1920.

1,358,936.

Patented Nov. 16, 1920.
2 SHEETS—SHEET 1.

L. W. Crompton, Inventors
W. J. Graham

By C. A. Snow & Co.
Attorneys.

Witness

L. W. CROMPTON AND W. J. GRAHAM.
AUTO EMERGENCY TIRE.
APPLICATION FILED JAN. 6, 1920.
1,358,936.
Patented Nov. 16, 1920.
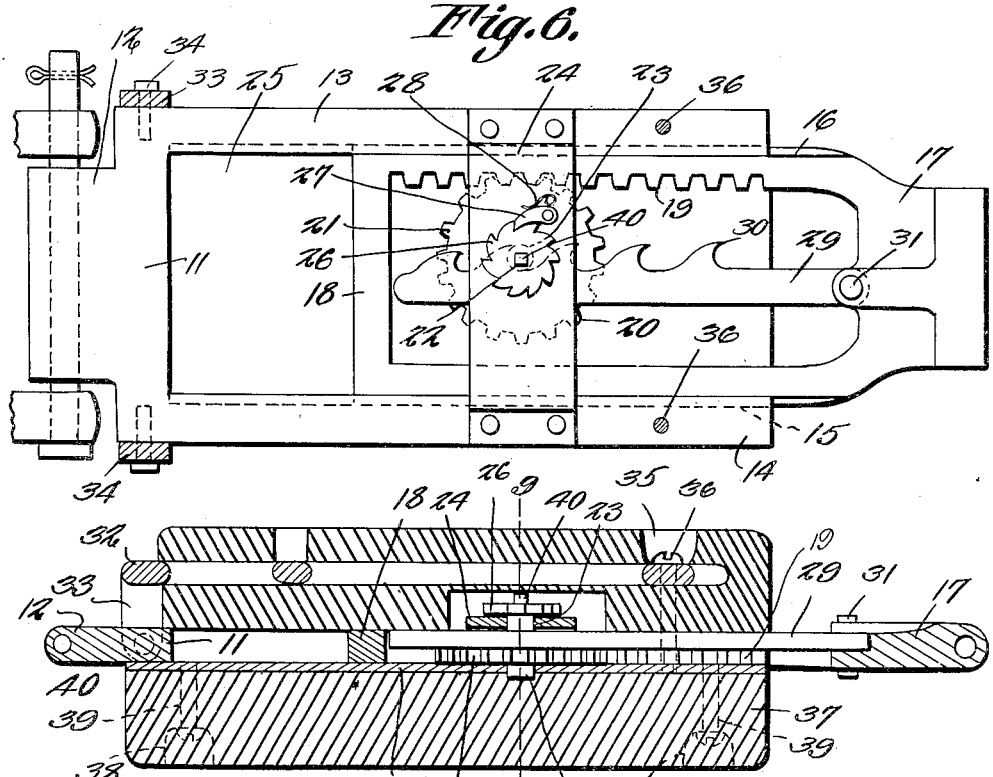
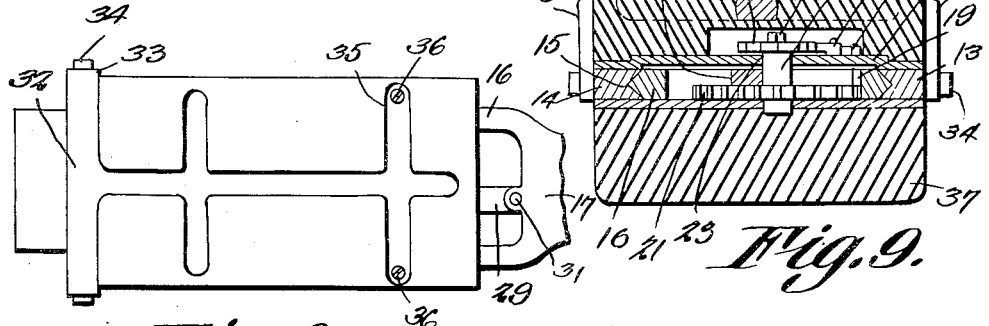
L. W. Crompton
W. J. Graham
Inventors

UNITED STATES PATENT OFFICE.

LIONEL W. CROMPTON AND WILLIAM J. GRAHAM, OF TAMPA, FLORIDA.

AUTO EMERGENCY-TIRE.

1,358,936.   Specification of Letters Patent.   Patented Nov. 16, 1920.

Application filed January 6, 1920. Serial No. 349,742.

*To all whom it may concern:*

Be it known that we, LIONEL W. CROMPTON and WILLIAM J. GRAHAM, citizens of the United States, residing at Tampa, in the county of Hillsborough, State of Florida, have invented a new and useful Auto Emergency-Tire, of which the following is a specification.

This invention relates to a novel form of cushion tire, and more particularly to a collapsible emergency tire to be employed to replace the pneumatic tire, in common use, when the pneumatic tire becomes punctured or otherwise rendered inoperative.

The primary object of the invention is to provide a device of this character which will possess the maximum amount of resiliency, and one which may be readily folded into a small and compact article to permit the same to be conveniently stored.

A further object of the invention is to provide means for adjusting the tire to various diameters, thus adapting the tire for use in connection with wheels of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 6 illustrates a plan view of the adjustable connecting means;

Fig. 7 illustrates a sectional view through the adjustable connecting means, the rubber inserts being shown as applied;

Fig. 8 illustrates a plan view of the same, and

Fig. 9 illustrates a sectional view taken on line 9—9 of Fig. 7.

Figure 1:
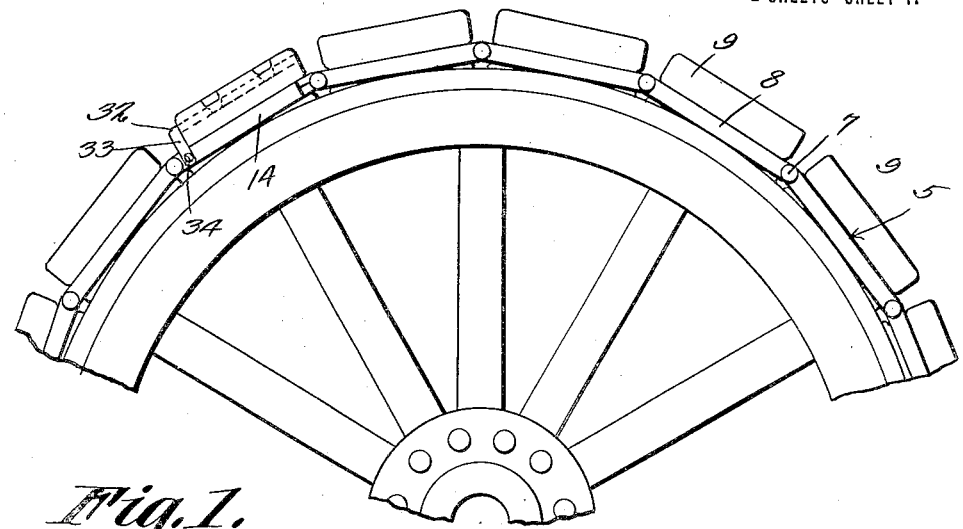
Figure 1 illustrates a fragmental elevational view of a wheel supplied with a tire constructed in accordance with the present invention.
Figure 2:
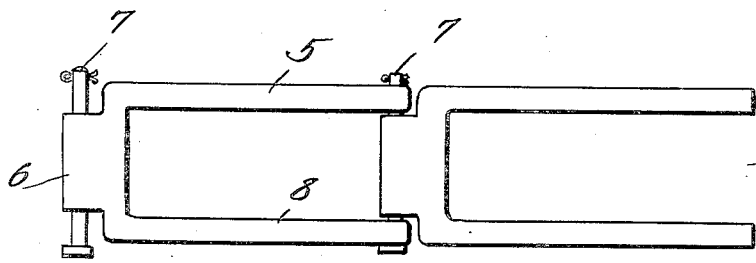
Fig. 2 illustrates a pair of links employed as the base for the tire.
Figure 3:
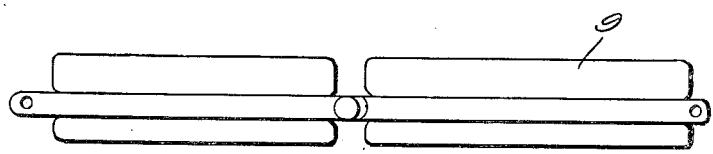
Fig. 3 illustrates a side elevational view of the links with the rubber inserts supplied thereto.
Figures 4, 5:
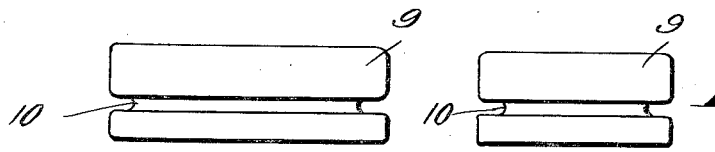
Fig. 4 illustrates a side elevational view of one of the rubber inserts.
Fig. 5 illustrates an end elevational view of the same.

Referring to the drawings in detail, the device is shown as constructed of a plurality of links 5, each of which is provided with a tongue 6, apertured to receive the pivot pin 7, for connecting adjacent links together, but at the same time to permit of free pivotal movement of one link with relation to the other.

Relatively long spaced arms 8 form a part of each of the links, the outer ends thereof being apertured to receive the pin 7 as before described. Thus it will be seen that the respective links include substantially U-shaped members, one end thereof being open to permit the rubber inserts, to be hereinafter more full described, to be positioned therein.

Each of these links supports a solid rubber insert 9, which is provided with a circumferential groove 10 disposed substantially intermediate the depth of the insert, the groove 10 being of a width to accommodate the arms 8 of the links, so that the side walls of the inserts will lie flush with the outer side walls of the arms 8.

A particularly constructed link is provided at the ends of the tire, which link includes a head 11, apertured tongue 12, and spaced side arms 13 and 14, each of which is provided with a groove 15, which grooves accommodate the side arms 16 of the opposed section 17, of the connecting link.

These arms 16 of the connecting link, are connected at their outer ends by means of the transversely extending bar 18, and as shown, the inner wall of one of the arms 16 is provided with the teeth 19, which teeth 19 mesh with the teeth 20 of the gear wheel 21 supported on the shaft 22 which operates in the bearings 23 of the supporting bar 24.

The supporting bar 24 is secured to the side arms 13 and 14 of one of the sections of the adjustable connecting link, the same being disposed substantially intermediate the lengths of the arms 13 and 14, to support the bearing 23.

On the opposite side of the arms 13 and 14 is a covering plate 25 which is also apertured to receive one end of the shaft 22 which supports the gear wheel 21 which is keyed to said shaft to move therewith.

Secured on the shaft 22 to move therewith, is the ratchet 26 which ratchet coöperates with the pawl 27 held into engagement with the ratchet 26 by means of the leaf spring 28, for preventing reverse movement of the gear wheel 21, when the same has been rotated to tighten the tire on a wheel.

An arm 29 is connected to the section 17 and extends in a horizontal plane between the arms 16 of the section 17, the arm 29 being provided with a plurality of spaced hooked members 30 which are curved toward the pivot pin 31, which connects the arms 29 to the section 17.

These hook members 30 are constructed to embrace a portion of the shaft 22, whereupon the sections of the adjustable link are secured together, and it will be seen that by moving the hook members adjacent the outer end of the arm 29, into engagement with the shaft 22, the diameter of the tire will be increased, whereas if the hook members 30 adjacent the pivot pin 31 are moved into engagement with the shaft 22, the diameter of the tire is decreased, so that the same may be applied to the felly of a relatively small wheel.

A frame 32 forms a part of one of the sections of the adjustable link member and has spaced arms 33 connected to one of the sections of the adjustable link as at 34 so that the frame may pivot with relation to the link to uncover the operating mechanism which operates to move the sections of the adjustable link, with relation to each other.

The rubber insert which has connection with the frame 32 is slotted to receive the frame, one portion thereof being cut away as at 35 to provide a clearance for the securing screws 36 which pass through sections of the frame 32, the threaded extremities thereof extending into suitable threaded openings formed in the covering plate 25.

On the opposite surface of the covering plate 25, is a rubber insert 37 which is also provided with cut out portions 38 to receive the securing screws 39 which have their threaded extremities positioned in suitable threaded openings formed in the covering plate.

In operation, the tire which is made up of a plurality of link sections as before described, is positioned on the felly of a wheel, the adjustable end connecting link, or the sections thereof are now brought together, one of the hook members 30 being brought into engagement with the shaft 22.

A suitable key or wrench is positioned on the squared end 40 of the shaft 22 to cause the rotation of the gear wheel 21 to cause the same to move one section of the adjustable link, with relation to the other with the result that the tire is tightened around the felly of the wheel.

The frame 32 is now moved downwardly over the upper surface of the adjustable link, and the screws 36 are operated to secure the frame 32 in position on the adjustable link.

From the foregoing it is obvious that to remove the tire it is only necessary to release the pawl 27 to permit the gear wheel 21 to be operated in the opposite direction, thus loosening, or increasing the diameter of the tire to the end that the same may be easily lifted over the usual clencher rim.

Having thus described the invention, what we claim as new is:—

1. A cushion tire including a plurality of pivoted link sections, an adjustable link for connecting the ends of the tire, said adjustable link comprising opposed arms, said arms having grooves formed therein, an adjustable section operating in the grooves, and means for moving the adjustable section within the grooves of the spaced arms.

2. A cushion tire including a plurality of pivoted link sections, an adjustable link for connecting the ends of the tire, said adjustable link including opposed arms, a covering plate forming a part of the adjustable link, a pivoted frame forming a part of the adjustable link, an adjustable section, means supported indirectly by the opposed arms and coöperating with the adjustable section for moving the adjustable section with relation to the spaced arms, and means for securing the frame to the adjustable link section.

3. A cushion tire including a plurality of pivoted link sections, an adjustable link for connecting the ends of the tire, said adjustable link including spaced arms, a supporting plate having connection with the spaced arms, an adjustable section adapted to operate between the spaced arms, a shaft operating through the supporting plate, an arm forming a part of the adjustable section and having means coöperating with the shaft for permitting adjustment of the adjustable section between the spaced arms and rotatable means for adjusting the adjustable section between the spaced arms.

In testimony that we claim the foregoing as our own, we have hereto affixed our signatures in the presence of two witnesses.

LIONEL W. CROMPTON.
WILLIAM J. GRAHAM.

Witnesses:
C. H. BOLL,
JAY COREAAISE.